United States Patent [19]

Nagata

[11] 4,164,748

[45] Aug. 14, 1979

[54] STEREOSCOPIC COLOR TELEVISION SYSTEM WITH LENTICULAR SCREEN

[76] Inventor: Kiyoshi Nagata, 2-209 Kosugi-cho, Nakahara-ku, Kawasaki-shi, Japan

[21] Appl. No.: 783,628

[22] Filed: Apr. 1, 1977

[30] Foreign Application Priority Data

Apr. 1, 1976 [JP] Japan .................................. 51-35114

[51] Int. Cl.² ............................................. H04N 9/60
[52] U.S. Cl. .................................................... 358/3
[58] Field of Search ........................... 358/3; 350/130; 354/101, 112

[56] References Cited

U.S. PATENT DOCUMENTS

| | | | |
|---|---|---|---|
| 3,457,364 | 7/1969 | Carrillo | 358/3 |
| 3,674,921 | 7/1972 | Goldsmith | 358/3 |

FOREIGN PATENT DOCUMENTS

| | | | |
|---|---|---|---|
| 1543994 | 10/1968 | France | 358/3 |
| 7011589 | 2/1971 | Netherlands | 358/3 |

Primary Examiner—Robert L. Griffin
Assistant Examiner—Aristotelis M. Psitos
Attorney, Agent, or Firm—Finnegan, Henderson, Farabow & Garrett

[57] ABSTRACT

A stereoscopic color television system in which operation of a plurality of color television cameras photographing the same object is switched over in turn per period of a color synchronization subcarrier to send forth video outputs from the plural color television cameras in succession. A stereoscopic color television picture tube includes a lenticular lens assembly whose lenticular lenses are each formed with an equal width to the horizontal pitch of apertures of a shadow mask or meshy focusing grid, and which is positioned between the shadow mask and face plate and also provided with a phosphor screen on the focal plane of the lenticular lens assembly, the phosphor screen being formed of a plurality of sets of red, green and blue phosphor stripes formed with an equal width to the vertical pitch of apertures of the shadow mask or meshy focusing grid. The color television picture tube further includes vertically arranged red, green and blue electron guns. The electron guns are provided in the same number of groups as the television cameras used, and operation of the groups of the electron guns is changed over successively, each time the operation of the color television cameras is switched over. Or, the color television picture tube includes one set of vertically arranged electron guns and electrostatic deflection electrodes or an electromagnetic deflection device arranged so as to horizontally shift electron beams from the set of electron guns, each time the operation of the plural color television cameras is changed over.

9 Claims, 17 Drawing Figures

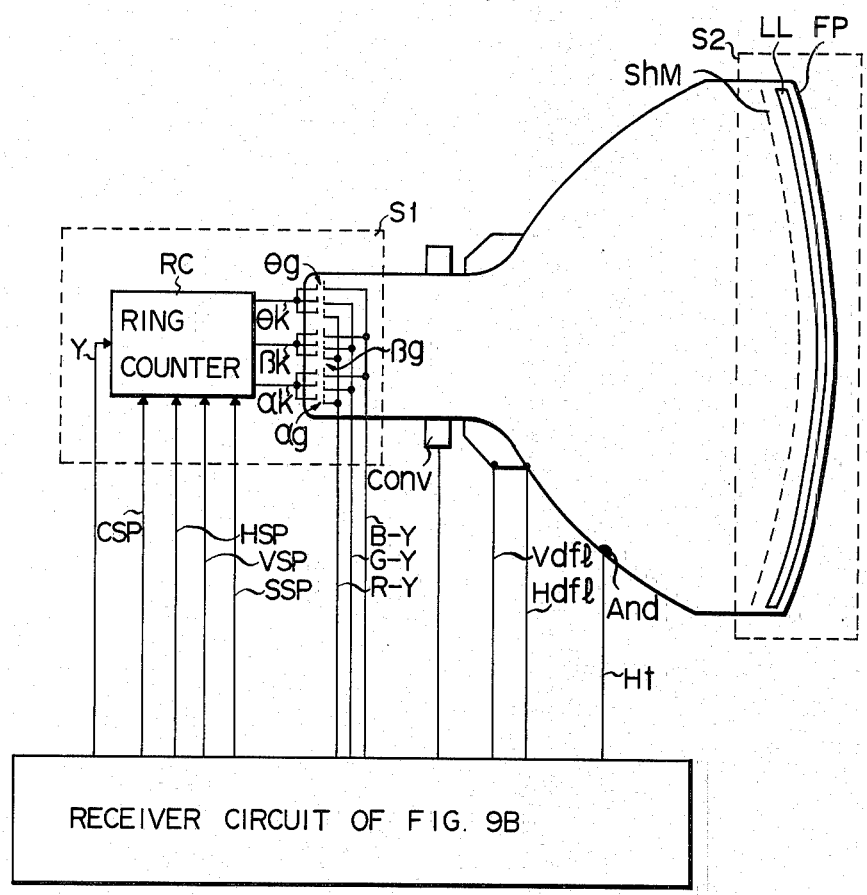

STEREOSCOPIC COLOR TELEVISION SYSTEM WITH LENTICULAR SCREEN

BACKGROUND OF THE INVENTION

This invention relates to a stereoscopic color television system. The known stereoscopic color television sytem include a type which comprises two picture tubes combined with polarizing glasses, a type using a lenticular lens assembly and a type based on application of laser rays. However, none of those known stereoscopic color television systems are as suitable as expected. For example, in known systems using a lenticular lens assembly true color stereoscopic pictures can be achieved at best at very limited viewing angles.

SUMMARY OF THE INVENTION

It is accordingly an object of this invention to provide a stereoscopic color television system based on the NTSC system.

Another object of the invention is to provide a stereoscopic color television receiving system adapted also to receive the existing broadcast color television and monochrome television.

Still another object of the invention is to provide a picture tube adapted suitably for reproduction of a stereoscopic color image.

A furthr object of this invention is to provide a three-dimensional color television system which enables true color stereoscopic viewing from any position without the necessity of using any viewing from any position without the necessity of using any viewing aids such as polarized glasses or special optical spectacles and is compatible with existing monochrome and color television systems.

According to an aspect of the invention, there is provided a stereoscopic color television transmission method comprising the steps of: photographing an object by M color television cameras provided with color signal outputs and horizontally arranged at an equal interval; generating a horizontal synchronization signal, a vertical synchronization signal for each field, a stereoscopic synchronization signal for every Mx2 fields or M frames and a color subcarrier signal; switching the operation of said M color television cameras successively in response to the horizontal synchronization signal, vertical synchronization signal, stereoscopic synchronization signal and color subcarrier signal per period of said color subcarrier signal, while changing for each field the order in which the operation of said M color television cameras is switched over during every M periods of the color subcarrier signal; and sending forth output signals from said M color television cameras together with the horizontal synchronization signal, vertical synchronization signal, stereoscopic synchronization signal and color subcarrier signal.

According to another aspect of this invention there is provided a color television receiver apparatus comprising a cathode ray tube including a faceplate, a shadow mask, a lenticular lens assembly which is disposed between the faceplate and shadow mask, and is formed of lenticular lenses horizontally arranged with an equal width to the horizontal pitch of apertures of the shadow mask and eash adapted to display the effect of a convex lens only in a horizontal direction, and a plurality of sets of three color phosphor stripes formed with an equal width to the vertical pitch of the apertures of the shadow mask on the focal plane of the lenticular lens assembly which faces the shadow mark, and M horizontally arranged groups of electron guns each formed of three vertically arranged electron guns; means for demodulating, upon the receipt of broadcast signals, a horizontal synchronization signal, vertical synchronization signal, stereoscopic synchronization signal, color subcarrier signal and three video signals including color information; means for coupling the three video signals to the corresponding electron guns of the M groups of electron guns included in the cathode ray tube; and means for succesively switching the operation of the M groups of electron guns in response to the horizontal synchronization signal, vertical synchronization signal, stereoscopic synchronization signal and color subcarrier signal.

According to still another aspect of this invention there is provided a stereoscopic color television receiver apparatus comprising a cathode ray tube including a faceplate, shadow mask, lenticular lens assembly which is disposed between the faceplate and shadow mask, and is formed of lenticular lenses horizontally arranged with an equal width to the horizontal pitch of apertures of the shadow mask and each adapted to display the effect of a convex lens only on a horizontal direction and a plurality of sets of three color phosphor stripes each formed with an equal width to the vertical pitch of apertures of the shadow mask on the focal plane of the lenticular lens assembly which faces the shadow mask, and three vertically arranged electron guns; means for demodulating, upon receipt of broadcast signals, a horizontal synchronization signal, vertical synchronization signal, stereoscopic signal, color subcarrier signal and three video signals including color information; means for coupling the three video signals to the corresponding electron guns included in the cathode ray tube; and means for horizontally shifting electron beams emitted from the three electron guns in response to the horizontal synchronization signal, vertical synchronization signal, stereoscopic synchronization signal and color subcarrier signal.

BRIEF DESCRIPTION OF THE DRAWINGS

FIGS. 9A and 9B show a block diagram of a stereoscopic color television receiver according to an embodiment of the invention;

DESCRIPTION OF THE PREFERRED EMBODIMENTS

Prior to description of a stereoscopic color television transmission system embodying this invention, there will now be explained the principle by which a stereoscopic color image is reproduced by reference to FIGS. 1 to 4 showing a cathode ray tube for the stereoscopic color television.

Figure 1:
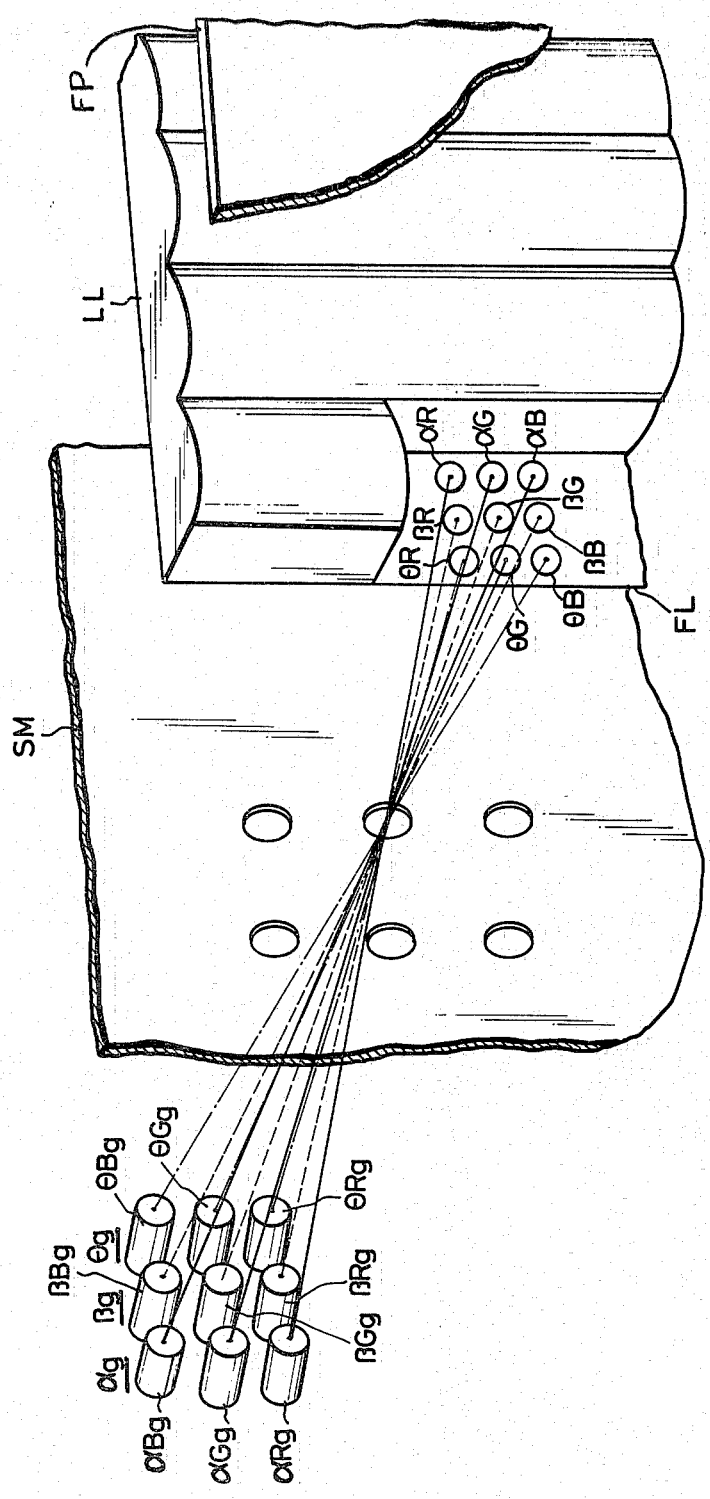
FIG. 1 is a schematic oblique view of a stereoscopic color television picture tube embodying the invention.

Referring to FIG. 1, the stereoscopic color picture tube of this invention includes a lenticular lens assembly LL positioned between a cathode ray tube faceplate FP and a shadow mask SM which may be of the same type as that used in the ordinary color television picture tube. The respective horizontally arranged lenticular lenses of the lenticuular lens assembly LL extend in the vertical direction of the faceplate FP and are each formed with an equal width to the horizontal pitch W of the holes of the shadow mask SM. Namely, in accordance with this invention, the lenticular lenses of the lenticular lens assembly LL are so arranged as to present the effect of a convex lens only in the lateral direction of the faceplate FP.

Figure 4:
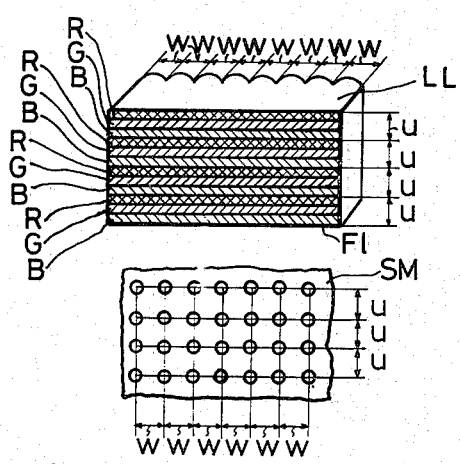
FIG. 4 shows the relationship of a lenticular lens assembly and a shadow mask.

The focal plane FL of the lenticular lens assembly LL which faces the shadow mask SM is made smooth. A large number of red, green and blue phosphor stripes R, G, B are horizontally formed, as shown in FIG. 4, on the smooth focal plane FL of the lenticular lens assembly LL. The respective sets of red, green and blue phosphor stripes R, G, B are arranged with an equal width to the longitudinal pitch U of the holes of the shadow mask SM.

As shown in FIG. 1, three electron gun groups $\alpha g$, $\beta g$, $\theta g$ each formed of three vertically arranged electron guns used for emission of red, green and blue lights respectively are set in a lateral direction. The three electron gun groups are so arranged that when electron beams emitted from the electron guns pass through a given hole of the shadow mask SM on the phosphor screen, then those portions of one set of red, green and blue phosphor stripes which correspond to the given hole and lie immediately under one lenticular lens of the lenticular lens assembly LL emit three color lights indicated by $\alpha R$, $\alpha G$, $\alpha B$; $\beta R$, $\beta G$, $\beta B$; and $\theta R$, $\theta G$, $\theta B$ according to the intensity of electron beams emitted from the electron guns.

In this invention, the operation of the electron gun groups $\alpha g$, $\beta g$, $\theta g$ is switched in turn at a rate equal to the frequency of a color synchronization subcarrier signal.

Figure 2:
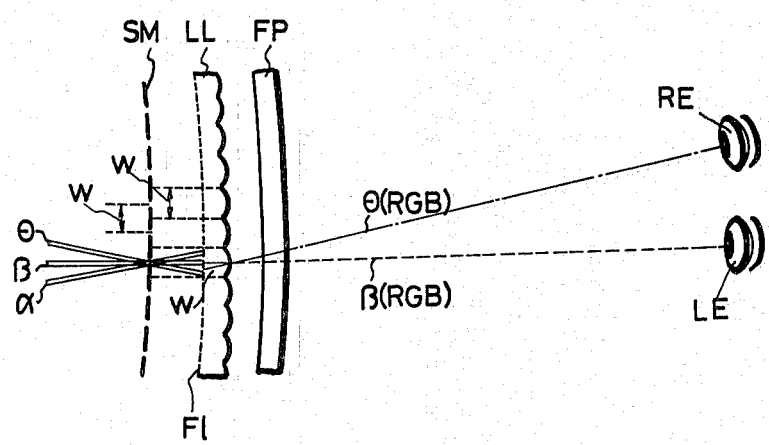
FIGS. 2 and 3 are diagrams for explaining the operation of the stereoscopic color television picture tube.
Figure 3:
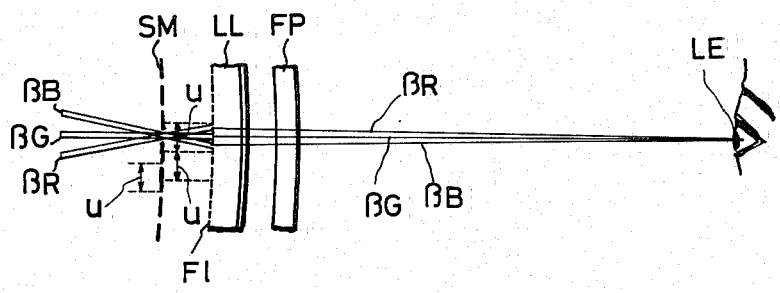

FIG. 2 shows the manner in which an image reproduced on the color television picture tube of FIG. 1 is watched by both eyes of an observer. Where the observer occupies a position shown in FIG. 2, the left and right eyes of the observer can see images reproduced by, for example, electron gun groups $\beta g$ and $\theta g$ due to the lateral lens action of the lenticular lens assembly LL, but cannot recognize an image reproduced by the electron gun group $\alpha g$. A bright spot under each lenticular lens is spread to the full width W of the lens due to its property. FIG. 3 presents the manner in which the observer's left eye LE watches an image reproduced by the electron gun group $\beta g$. Depending on the position occupied by an observer, images reproduced by the electron gun groups ($\alpha g + \beta g$), ($\alpha g + \theta g$), or ($\beta g + \theta g$) can be observed, thereby allowing true color stereoscopic viewing from a plurality of positions. As mentioned above, the observer's left eye LE and right eye RE watch different images. Obviously, therefore, these images, if stereoscopically picked up, admit of a stereoscopic observation.

Figure 5:
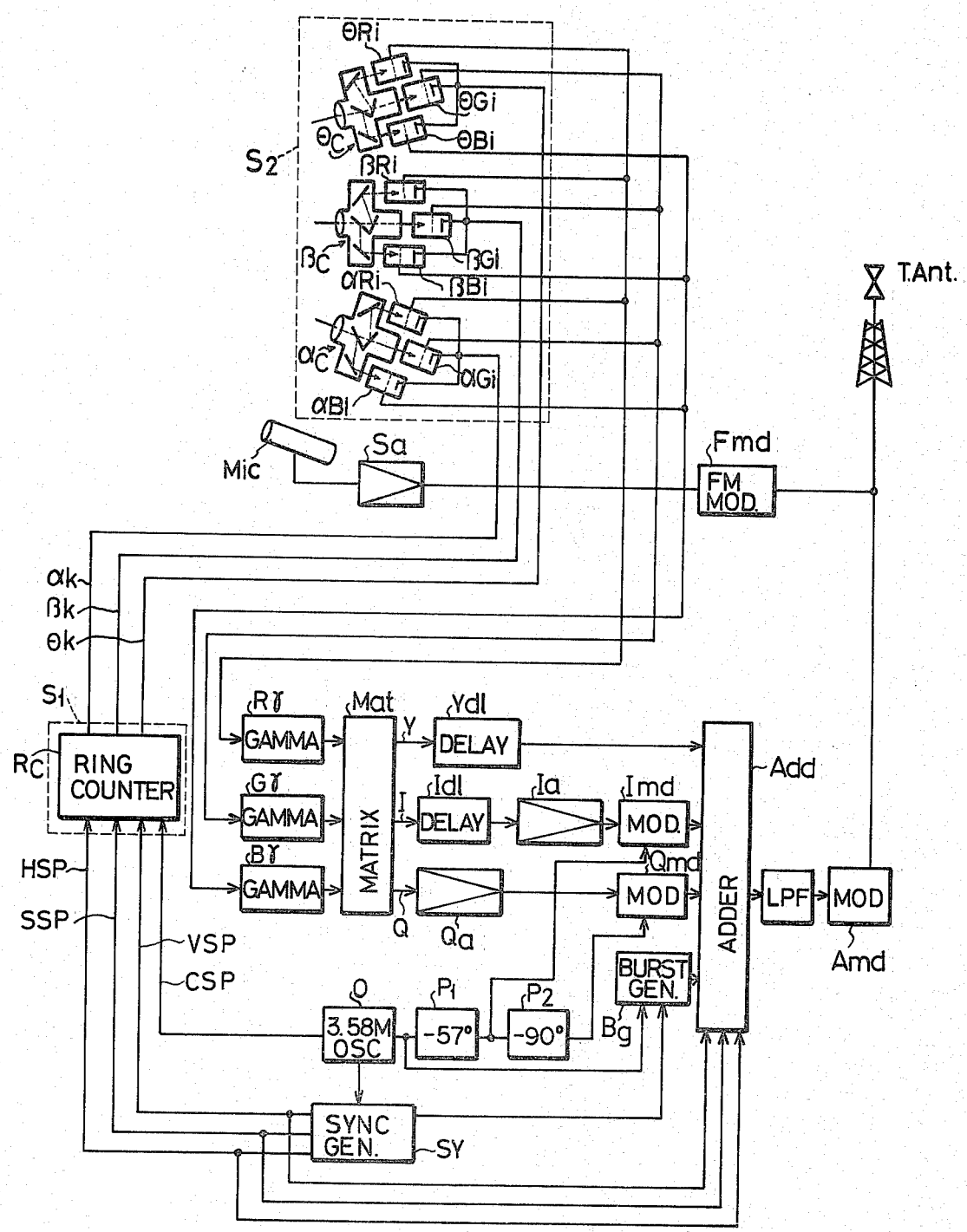
FIG. 5 is a block diagram of a stereoscopic color television transmission system embodying the invention.

FIG. 5 is a block diagram of a stereoscopic color television transmission system embodying this invention. This system is little different from the ordinary color television transmission system, except for the sections S1, S2 enclosed in broken lines. Red, blue and green video signals from the color television camera section S2 are supplied to a matrix circuit Mat through gamma correction circuits R$\gamma$, G$\gamma$, B$\gamma$ to provide a luminance signal Y and color video signals I, Q. The Q signal is conducted to a 0.5 MHz bandpass amplifier Qa. The I signal is applied to a 1.5 MHz bandpass amplifier Ia through a delay circuit Id1. The Y signal is applied to another delay circuit Yd1.

A color subcarrier of 3.58 MHz generated by an oscillator O has its phase shifted $-57°$ by a first phase shifter P1, and further shifted $-90°$ by a second phase shifter P2. An output from the second phase shifter P2 is suppressed-carrier amplitude-modulated by the Q signal from the bandpass amplifier Qa in a balanced modulator Qmd. An output from the first phase shifter P1 is suppressed-carrier amplitude-modulated by the I signal from the bandpass amplifier Ia in a balanced modulator Imd.

The 3.58 MHz color subcarrier is applied to a color synchronization burst generator Bg and synchronization signal generator SY to provide a horizontal synchronization signal HSP, vertical synchronization signal VSP and stereoscopic synchronization signal SSP. Outputs from the delay circuit Yd1, modulators Imd, Qmd, color synchronization burst generator Bg and synchronization signal generator SY are delivered to an adder Add to provide a colorplexed video signal. The colorplexed video signal is applied to an amplitude modulator Amd through a low pass filter LPF. Voices picked up by a microphone Mic are amplified by an amplifier Sa. A sound carrier is frequency modulated with the output signal of the amplifier Sa in a frequency modulator Fmd. Outputs from the amplitude modulator Amd and frequency modulator Fmd are coupled to a transmission antenna T.Ant. A transmitted signal has a frequency band of about 6 MHz as in the ordinary television broadcasting.

The color television camera section S2 comprises, for example, three color television cameras $\alpha c$, $\beta c$, $\theta c$ equidistantly spaced in a horizontal direction as shown in FIG. 5.

As far as the stereoscopic photographing of an object is concerned, the interspace between the cameras $\alpha c$, $\beta c$, $\theta c$ has no direct relationship with a distance between both eyes of an observer. Therefore, the interspace of the cameras $\alpha c$, $\beta c$, $\theta c$ may be suitably chosen. The camera $\alpha c$ comprises red, green and blue pickup tubes $\alpha Ri$, $\alpha Gi$, $\alpha Bi$; the camera $\beta c$ comprises red, green and blue pickup tubes $\beta Ri$, $\beta Gi$, $\beta Bi$; and the camera $\theta c$ comprises red, green and blue pickup tubes $\theta Ri$, $\theta Gi$, $\theta Bi$.

The cathodes of the pickup tubes of the respective cameras αc, βc, θc are jointly connected to the corresponding output terminals of the camera switching section S1. The input terminals of the camera switching section S1 are supplied with 3.58 MHz color synchronization pulses from the oscillator O, horizontal synchronization pulses HSP and vertical synchronization pulses VSP and stereoscopic synchronization pulses SSP emitted for every three picture frames (or 6 fields) from the synchronization signal generator SY, thereby causing the cameras αc, βc, θc to be successively switched per period of the color synchronization pulses.

Figure 6:
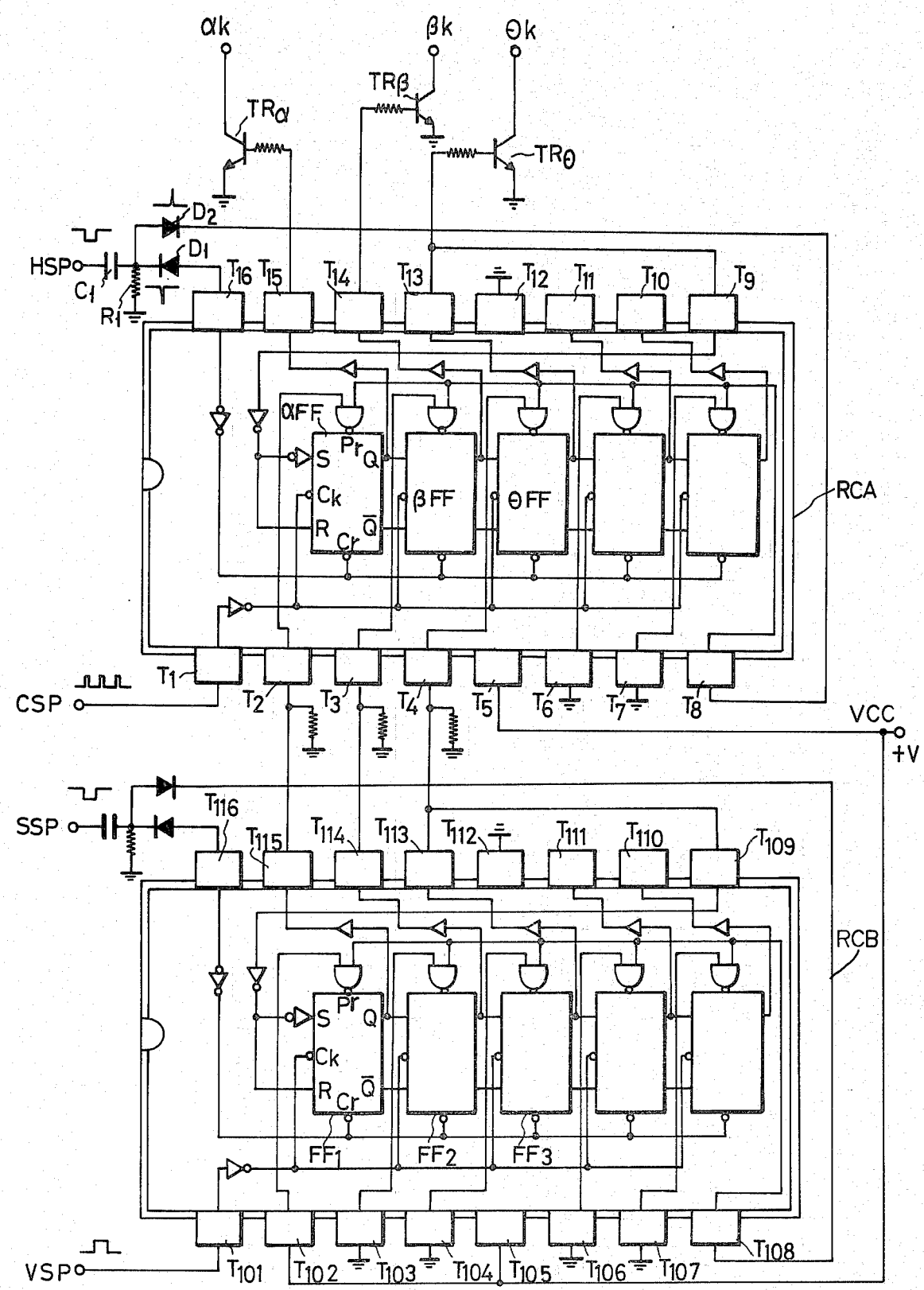
FIG. 6 indicates the section for switching the color television cameras of FIG. 5.

FIG. 6 illustrates the arrangement of the camera switching section S1 which is formed of a ring counter comprising two TTL logic integrated circuits SN7496N manufactured by Texas Instrument Incorporated. Negative horizontal synchronization pulses HSP are supplied to a differentiation circuit formed of a capacitor C1 and resistor R1. A negative spike pulse generated by the differentiation circuit is applied to the terminal T16 of a first ring counter RCA through a diode D1. A positive spike pulse produced by the differentiation circuit is applied to the terminal T8 of the first ring counter RCA through a diode D2. The terminal T16 is connected to the clear terminals Cr of flip-flop circuits αFF, βFF, θFF, all of which, therefore, are cleared in response to the negative transition of the horizontal synchronization pulses. As the result, the output terminals Q of all the flip-flop circuits are set at a zero potential.

The terminal T8 of the first ring counter RCA is connected to the preset terminals Pr of the flip-flop circuits αFF, βFF, θFF through NAND gates. Terminals T2, T3 and T4 are coupled to the preset terminals Pr of the flip-flop circuits αFF, βFF and θFF through the NAND gates, respectively. Each flip-flop circuit is preset when the positive spike pulse is applied to the terminal T8 and the corresponding one of the terminals T2, T3 and T4 is at a positive level. When, therefore, the terminal T2 connected to the terminal T115 of a second ring counter RCB is at a positive potential, then the flip-flop circuit αFF is preset. Accordingly, the output terminal Q of the flip-flop circuit αFF is rendered positive to activate a transistor TRα connected to the terminal T15, thereby causing the cathodes of the pickup tubes of the color television camera αc to be grounded to operate the camera αc. At this time, only the camera αc sends forth video signals.

3.58 MHz color synchronization pulses CSP are applied to the terminal T1 coupled to the clock terminals CK of the flip-flop circuits αFF, βFF, θFF. The outputs Q of the flip-flop circuits αFF, βFF, θFF are successively rendered positive by the color synchronization pulses CSP. Namely, if a color synchronization pulse is applied to the terminal T1 when the output Q of the flip-flop circuit αFF is positive, then the output Q of the flip-flop circuit αFF is set to the zero potential and the output of the flip-flop circuit βFF is set to the positive level. At this time, the transistor TRβ connected to the terminal T14 is rendered conductive and the video signals from the camera βc are sent forth. Upon receipt of the next color synchronization pulse, only the terminal T13 is rendered positive to activate the transistor TRθ. As a result the camera θc sends forth video signals. When the succeeding color synchronization pulse CSP is delivered to the terminal T1, then the output terminal Q of the flip-flop circuit αFF is set to the positive level to render the transistor TRα conductive. Consequently, the camera αc is put into operation and sends forth video signals.

Thus, the operation of the color television cameras αc, βc, θc is switched over in turn per period of a color synchronization pulse CSP during every period of horizontal scanning. Periodically changing the order of camera scanning operation, as is explained in more detail below, minimizes the loss of resolution and flicker which could result from a non-alternated scanning order. Accordingly, when each succeeding horizontal synchronization pulse is supplied, all the flip-flop circuits are cleared. Thereafter, the operation of the color television cameras αc, βc, θc is changed over successively in the order mentioned upon receipt of color synchronization pulses CSP during the horizontal scanning period of the first field (odd field).

The determination of which camera will first operate at the beginning of each horizontal scanning panel in the above-mentioned changed-over operation of the color television cameras αc, βc, θc is controlled by the second ring counter RCB connected to receive stereoscopic synchronization signal SSP and vertical synchronization signal VSP. Namely, upon receipt of stereoscopic synchronization signal SSP produced for every six fields (or three frames) in synchronism with a vertical synchronization pulse VSP, flip-flop circuits FF1, FF2, FF3 included in the second ring counter RCB are cleared like the flip-flop circuits αFF, βFF, θFF included in the first ring counter RCA. Later, the flip-flop circuit FF1 alone is preset since terminal T102 is connected to a positive DC power supply Vcc and the output terminal Q thereof is set to the positive level. Since the terminal T115 connected to the output terminal Q of the flip-flop circuit FF1 is also connected to the terminal T2 of the first ring counter RCA, the flip-flop circuit αFF alone is preset as previously described. In the first field immediately following the issue of a stereoscopic synchronization pulse SSP, the operation of the color television cameras αc, βc, θc is changed over successively in the order mentioned. The outputs Q of the flip-flop circuits FF1, FF2, FF3 of the second ring counter RCB are successively set to the positive level, each time a vertical synchronization pulse VSP is supplied to the terminal 101. In the the second field following the first field, the output Q of the flip-flop circuit FF2 alone is set to the positive level. Since the terminal T3 is rendered positive which is connected to the terminal T114 connected with the output Q of the flip-flop circuit FF2, the flip-flop circuit βFF alone of the first ring counter RCA is preset. Namely, in the second field, the operation of the color television cameras βc, θc, αc begins with camera Bc and is changed over in the order mentioned for each horizontal scanning period.

Figure 7:
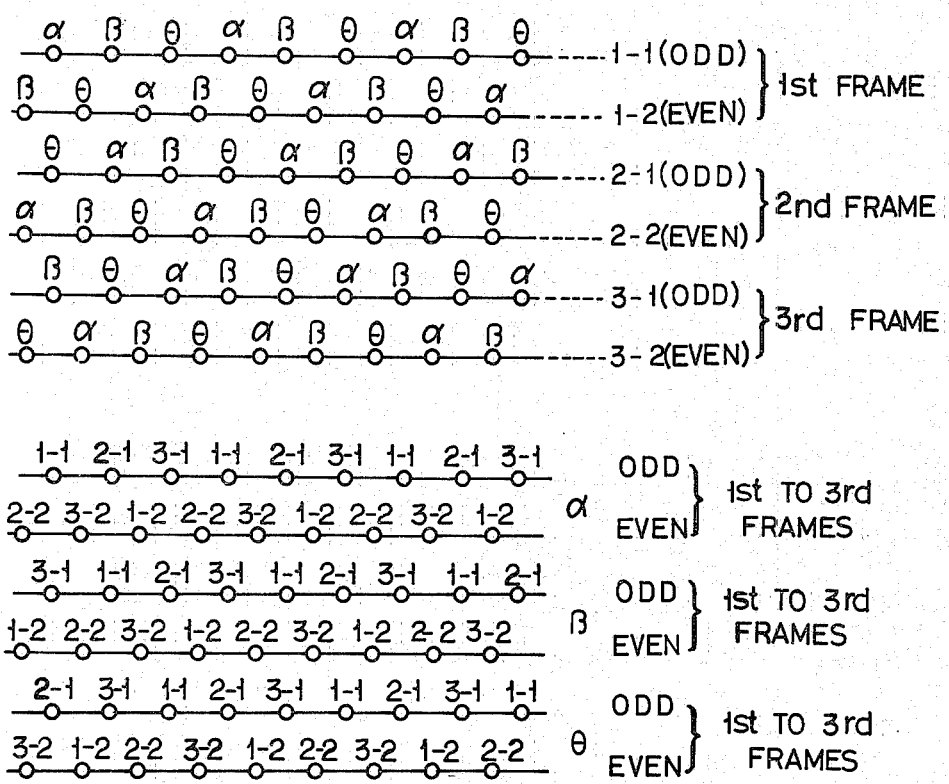
FIG. 7 shows the order in which the operation of the color television cameras in switched over for each field.

In the third field, the output terminal Q of the flip-flop circuit FF3 alone is set to the positive level. In the third field, therefore, the operation of the color television cameras θc, αc, βc begins with camera θc and is changed over successively in the order mentioned. The operation of the color television cameras is switched over in the order of αc, βc, θc in the fourth field, in the order of βc, θc, αc in the fifth field and in the order of θc, αc, βc in the sixth field. In the seventh and succeeding fields, the above-mentioned switching of the operation of the color television cameras is repeated by the same process as described above due to an interlaced scanning system and the issue of a stereoscopic synchronization signal for every six fields. FIG. 7 shows the order in which the operation of the color television cameras is changed over in different orders throughout the first to the sixth field.

As apparent from the foregoing description, where three color television cameras are used, each camera sends forth one picture frame in one-tenth of a second. It is further apparent from the foregoing description that the disclosed sequencing of the starting order of switching the three cameras enhences image resolution or definition which otherwise would have been reduced over normal resolution or definition by the multiplexing of three picture signals. Where M color television cameras are provided, a stereoscopic synchronization signal is issued for every M×2 fields. In this case, each camera generates one picture frame in a time of M/30 sec.

Figure 8:
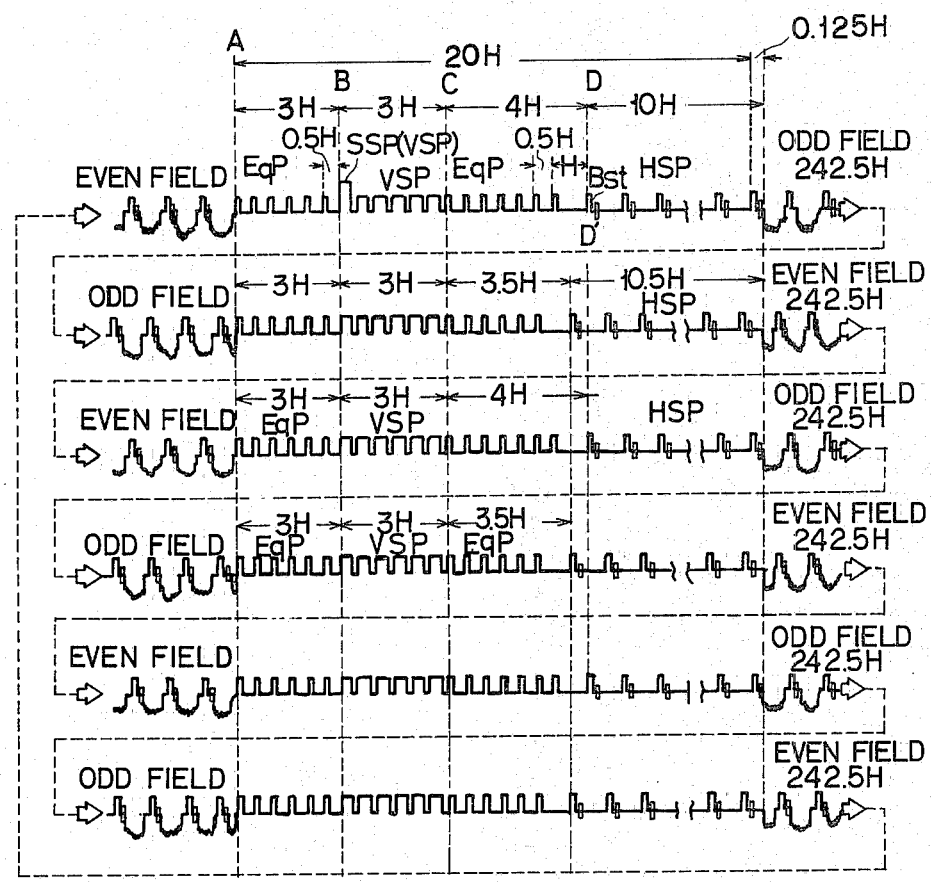
FIG. 8 shows the waveforms of video signals issued during three picture frames by the stereoscopic color television system of the invention.

FIG. 8 shows the waveforms of video signals issued during three picture frames by the stereoscopic color television system of this invention. Bst denotes a burst signal and Eqp shows an equalization pulse. A stereoscopic synchronization signal is overlapped on a vertical synchronization signal VSP at the rate of once for every three frames.

Figure 9B:
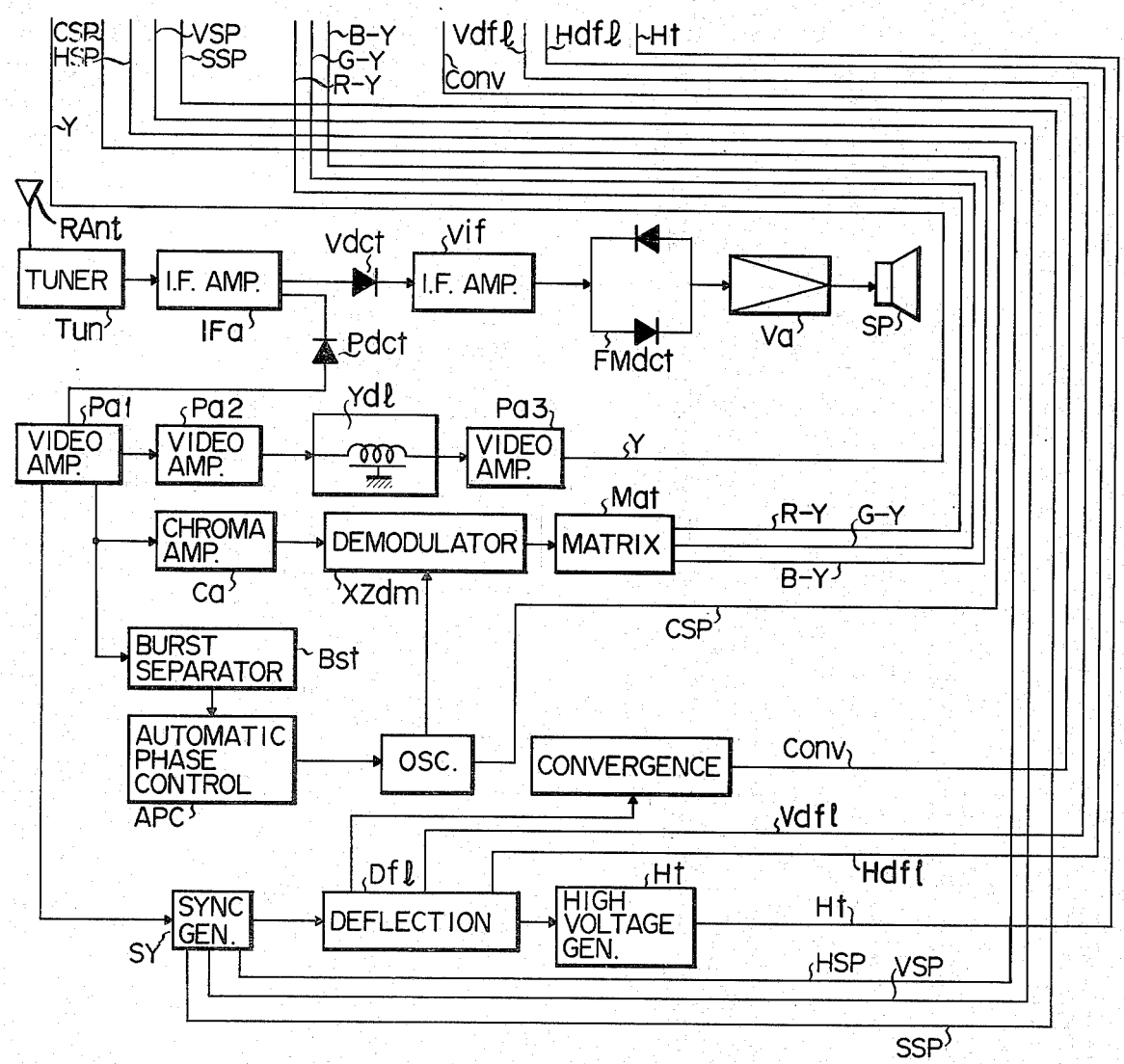

FIG. 9 represents the arrangement of a color television receiving device provided with a cathode ray tube including nine electron guns as shown in FIG. 1. This receiving device is little different from the ordinary color television receiving device except for the sections S1, S2 enclosed in broken lines. Tun denotes a tuner; IFa an intermediate frequency amplifier; Pdct a video signal detector; Pa1 a first video amplifier; Pa2 a second video amplifier for amplifying a Y signal; Yd1 a delay circuit for delaying the Y signal; Pa3 a third video amplifier; Ca a bandpass amplifier; Bst a burst gate; APC an automatic phase control circuit; and XZdm a demodulator for demodulating the signals X, Z by a color subcarrier issued from the 3.58 MHz oscillator OSC. Color video signals R-Y, G-Y, B-Y are respectively synthesized by a matrix circuit Mat. SY denotes a synchronization signal separator for separating a horizontal synchronization signal HSP, vertical synchronization signal VSP and stereoscopic synchronization signal SSP form an output signal from the first video amplifier Pa1, Df1 shows horizontal and vertical deflection circuits; Ht a high voltage power source for the anode And of the picture tube; Conv a convergence device; Vdct a sound detection circuit; Vif an intermediate frequency amplifier; FMdct an FM detector; Va an audio amplifier; and SP a loudspeaker.

The ring counter section RC of FIG. 9 has the same arrangement as that of FIG. 6. Namely, the ring counter section RC causes the operation of three groups $\theta g$, $\beta g$, $\alpha g$ of electron guns of the picture tube which are arranged in the same manner as in FIG. 1 to be switched over, each time operation of the corresponding three color television cameras is changed over. A demodulated Y signal is supplied to the cathode of that group of electron guns which is operated. Color video signals R-Y, G-Y, B-Y are applied to the grids of the corresponding electron guns of the respective groups. Since a stereoscopic color picture picked up by the color television cameras $\alpha c$, $\beta c$, $\theta c$ is reproduced on a picture tube, an observer can recognize a stereoscopic color picture by the action of a lenticular lens assembly.

Figure 12:
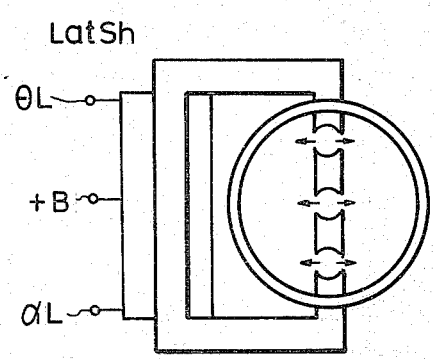
FIG. 12 schematically indicates a lateral shift device used with the receiver of FIG. 10.
Figure 10:
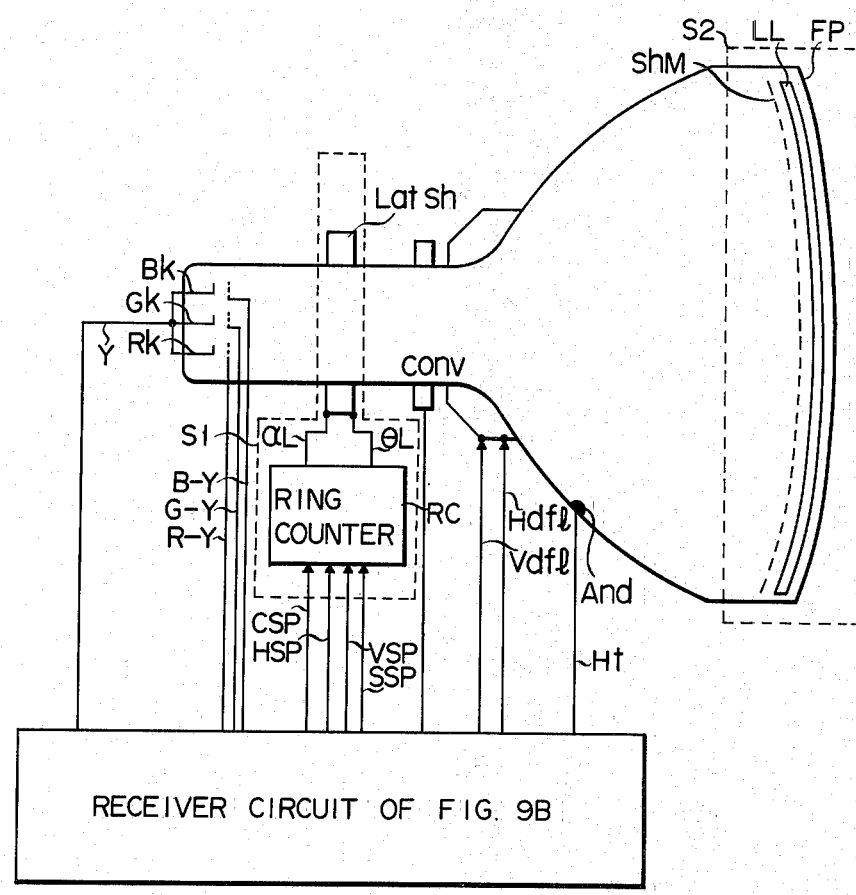
FIG. 10 shows a stereoscopic color television receiver according to another embodiment of the invention.
Figure 11:
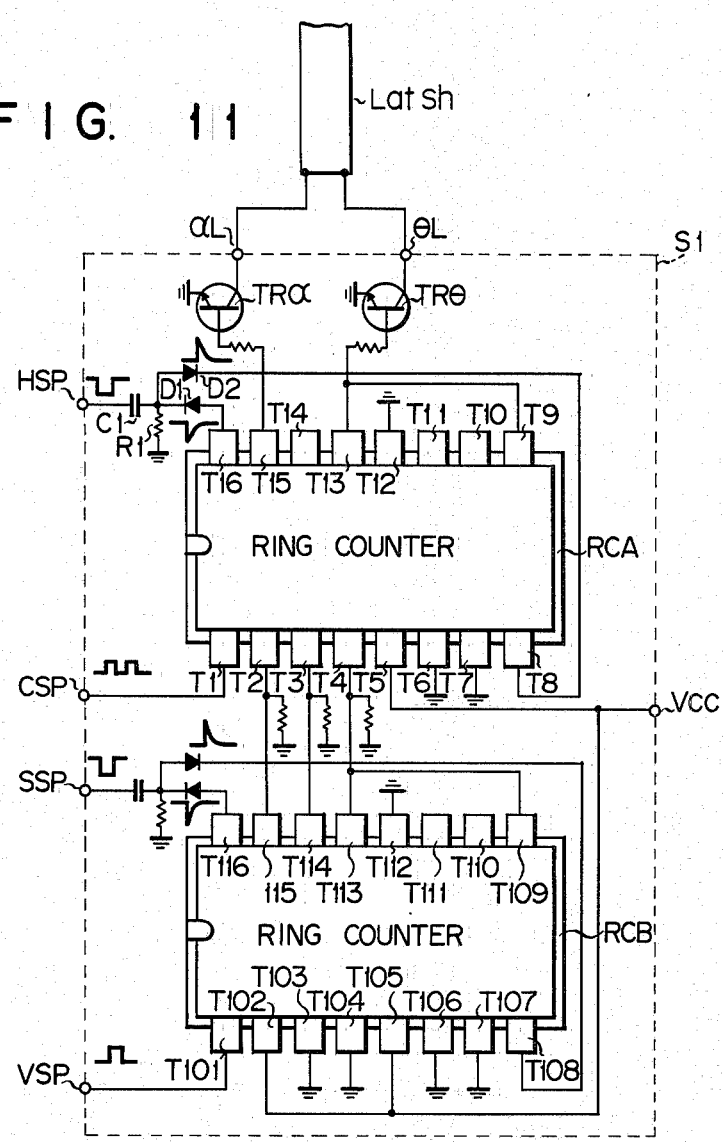
FIG. 11 shows the arrangement of a ring counter for shifting electron beams used with the receiver of FIG. 10.

FIG. 10 indicates the arrangement of a stereoscopic color television receiving device according to another embodiment of this invention. This embodiment comprises only one group of vertically arranged red, blue and green electron guns and an electromagnetic lateral shifting device Latsh responsive to a ring counter RC for shifting electron beams emitted from electron guns in a horizontal direction in synchronism with the operation of the color television cameras. With the ring counter section S1 of FIG. 10, the terminal T15 of a first ring counter RCA is connected to the base of a transistor TR$\alpha$ and the terminal T13 thereof is connected to the base of a transistor TR$\theta$ as shown in FIG. 11. The terminal T14 of the first ring counter RCA is put out of use in this embodiment. The collectors of the transistors TR$\alpha$, TR$\theta$ are connected, as shown in FIG. 12, to the terminals $\theta L$, $\alpha L$ of the lateral shifting device Latsh. When the terminal T15 of the first ring counter RCA is rendered positive, namely, when the color television camera $\alpha c$ is operated, then current flows through coils lying between the terminals +B, $\alpha L$ of the lateral shifting device Latsh, causing electron beams emitted from the electron gun group to be shifted in the right direction of FIG. 12. When the terminal T13 of the first ring counter RCA is rendered positive, then current flows through coils lying between the terminals +B, $\theta L$ of the lateral shifting device Latsh, causing electron beams emitted from the electron gun group to be shifted in the left direction of FIG. 12. When the terminal T14 of the first ring counter RCA is rendered positive, then the lateral shifting device Latsh causes electron beams emitted from the electron gun group to move straight forward without deflection.

Figure 13:
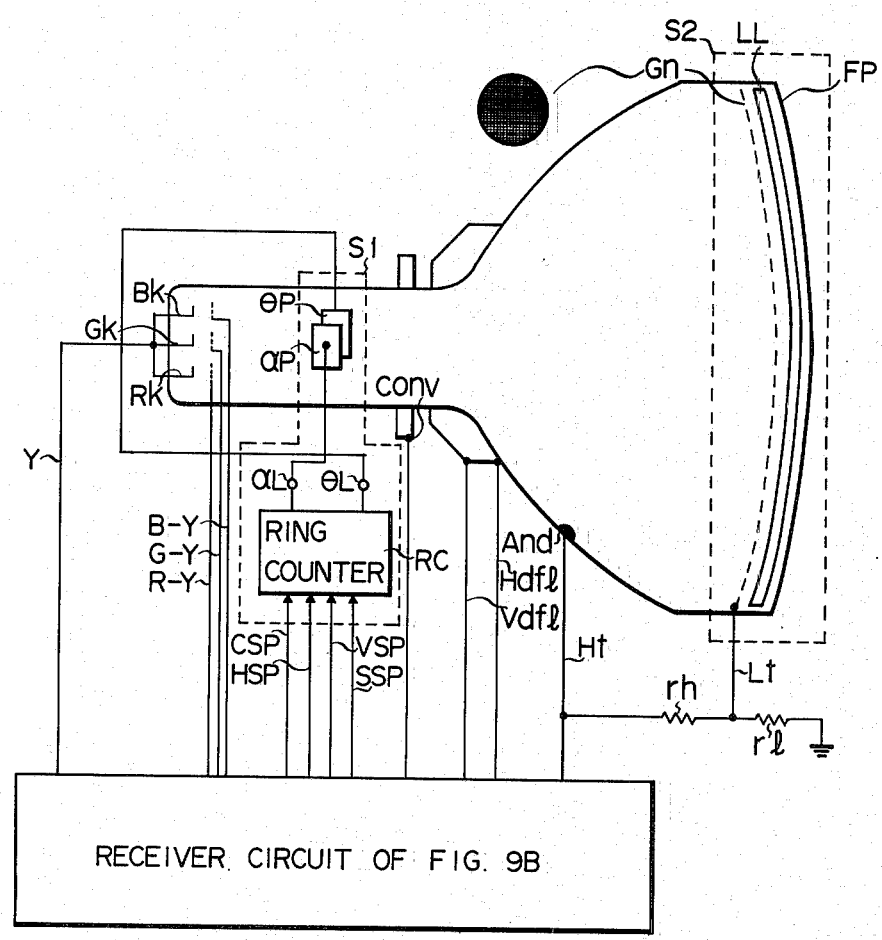
FIG. 13 shows a stereoscopic color television receiver according to still another embodiment of the invention.

FIG. 13 represents a stereoscopic color television receiving device according to still another embodiment of this invention. This embodiment comprises control electrodes $\theta p$, $\alpha p$ for effecting the horizontal shifting of electron beams emitted from the vertically arranged electron guns and, in place of a shadow mask, a meshy focusing grid Gn for focusing electron beams.

The meshy focusing grid Gn is formed of 400 to 800 substantially square meshes in the horizontal direction and is normally impressed with a voltage about 15 kv lower than that of the anode And of the picture tube. When passing through the meshes, electron beams emitted from the electron gun group are focused to impinge on a phosphor screen.

Figure 14:
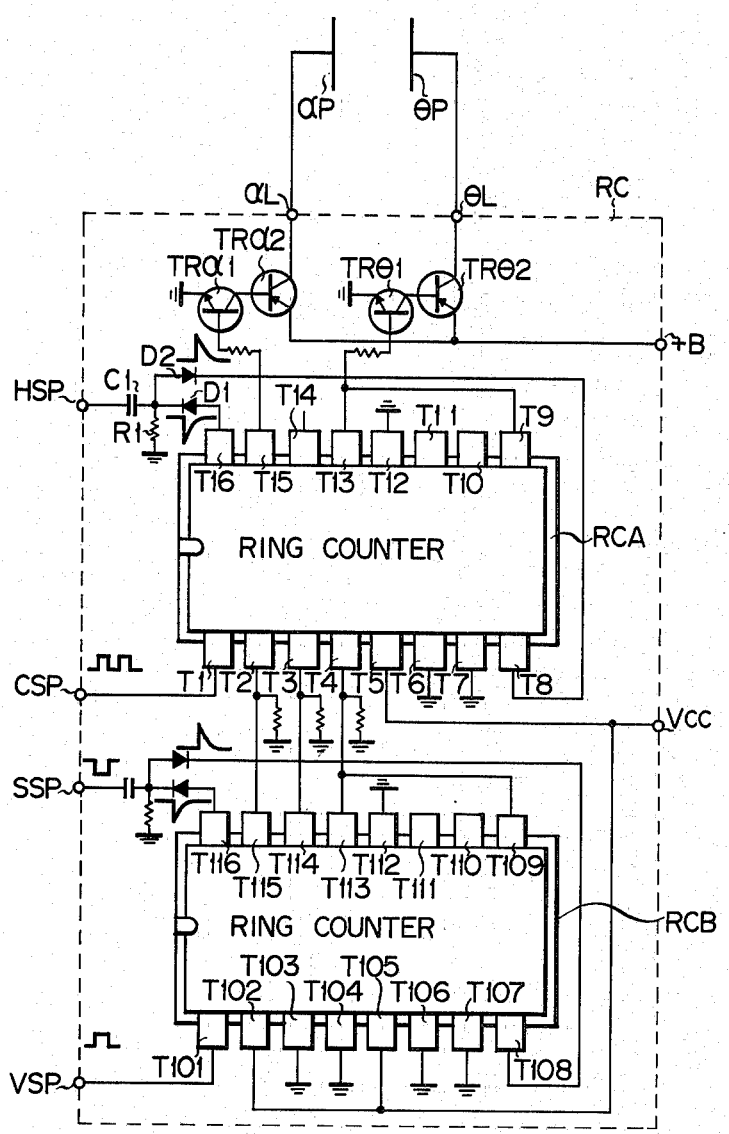
FIG. 14 shows the arrangement of a ring counter section of FIG. 13.

FIG. 14 shows the arrangement of a ring counter section RC used with the embodiment of FIG. 13. The terminal T15 of a first ring counter RCA is connected to the base of a transistor TR$\alpha$1 whose collector is connected to the base of a transistor TR$\alpha$2. The terminal T13 of the first ring counter RCA is connected to the base of a transistor TR$\theta$1 whose collector is connected to the base of a transistor TR$\theta$2. The collectors of the transistors TR$\alpha$2, TR$\theta$2 are connected to the control electrodes $\alpha p$, $\theta p$ respectively and the emitters of transistors TR$\alpha$2, TR$\theta$2 are jointly connected to the +B power supply terminal.

When the terminal T15 of the first ring counter RCA becomes positive, then the transistors TR$\alpha$1, TR$\alpha$2 are rendered conducting, and the control electrode $\alpha p$ is impressed with +B voltage, thereby causing electron beams emitted from the electron gun group to be shifted in the left direction. When the terminal T13 of the first ring counter RCA is rendered positive, then the transistors TR$\theta$1, TR$\theta$2 are rendered conducting to connect the control electrode $\theta p$ to the +B power supply terminal, causing the electron beams emitted from the electron gun group to be shifted in the right direction. When the terminal T14 of the first ring counter RCA is made positive, then neither of the control electrodes $\alpha p$, $\theta p$ is connected to the +B power supply terminal, causing the electron beams emitted from the electron gun group to run straight between the control electrodes αp, θp.

Figure 15:
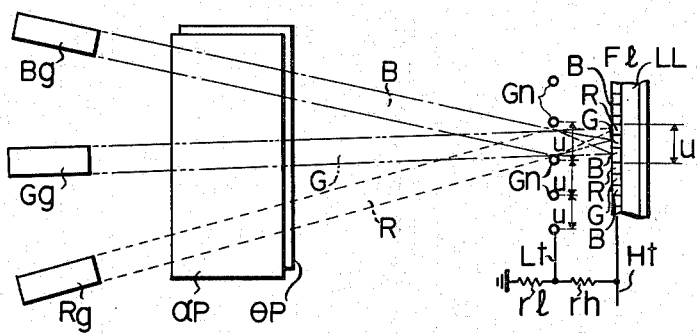
FIGS. 15 and 16 illustrate the operation of the color television receiver of FIG. 13.
Figure 16:
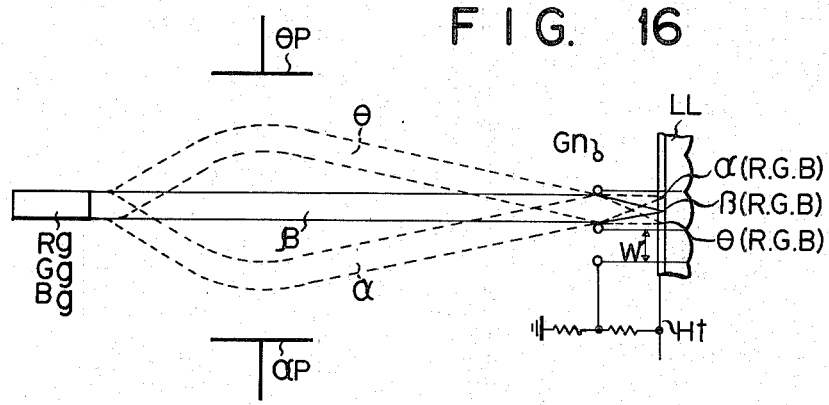

FIG. 15 illustrates the operation of a picture tube used with the embodiment of FIG. 13. Electron beam emitted from the top blue electron gun Bg is focused by the focusing grid Gn to land on a blue stripe occupying the lowest position in one set of phosphor stripes formed on a phosphor plane Fl. Electron beam emitted from the central green electron gun Gg lands on a green stripe occupying the central position of said one set of phosphor stripes. Electron beam emitted from the bottom red electron gun Rg land on a red stripe occupying the top position of said one set of phosphor stripes. FIG. 16 shows the process by which a pair of control electrodes αp, θp enables a single group of electron guns to have the same function as three groups of electron guns. As apparent from FIGS. 15 and 16, a color television picture tube used with the embodiment of FIG. 13 comprises a plurality of sets of red, green and blue phosphor stripes each arranged with substantially the same equal width as the vertical width of the respective meshes of the meshy focusing grid Gn. The respective lenses of the lenticular lens assembly L are each formed with substantially the same width as the horizontal width of the respective meshes of the focusing grid Gn.

It will be seen from the foregoing description that with a stereoscopic color television system of this invention, ten frames of pictures ae reproduced per second, with the unavoidable accompaniment of some flickers. Therefore, phosphors used with the picture tube of this invention are preferred to be a type having some degree of persistence. With a shadow mask type picture tube, a reproduced picture becomes slightly dark, making it necessary to increase the anode voltage of the picture tube. If the above described meshy focusing grid is employed and/or if a color synchronization subcarrier is chosen to have a frequency of about 10 MHz, then the above-mentioned flickers will be effectively eliminated.

When the broadcast ordinary color or monochrome television is received by the above-mentioned stereoscopic television receiving system of this invention, then three identical pictures are reproduced, preventng an observer from recognizing a stereoscopic picture, and simply reproducing the same picture as is obtained from the ordinary television receiving device. The stereoscoping television system of the invention, if used in a closed circuit, will display a more prominent effect.

What is claimed is:

1. A stereoscopic color television transmission method comprising the steps of:
    photographing an object by M color television cameras, where M is an integer greater than two, provided with color signal outputs each divided into fields of horizontal line scans said cameras being horizontally arranged at equal intervals;
    generating a horizontal synchronization signal at the end of each horizontal scan, a vertical synchronization signal for each field, a stereoscopic synchronization signal for every Mx2 fields or M frames and a color subcarrier signal;
    switching the operatin of said M color television cameras successively in response to the horizontal synchronization signal, vertical synchronization signal, stereoscopic synchronization signal and color subcarrier signal per period of said color subcarrier signal, while changing for each field the order in which the operation of said M color television cameras is switched over during every M periods of the color subcarrier signal; and
    sending forth output signals from said M color television cameras together with the horizontal synchronization signal, vertical synchronization signal, stereoscopic synchronization signal and color subcarrier signal.

2. A stereoscopic color television transmission system comprising:
    M color television cameras, where M is an integer greater than two, equidistantly arranged in a horizontal direction to stereoscopically photograph an object and provided with output terminals for deriving three color signals each divided into fields of horizontal scans;
    means for providing a horizontal synchronization signal for each horizontal scan, a vertical synchronization signal for each field, a stereoscopic synchronization signal for every Mx2 fields or M frames, and a color subcarrier signal;
    means for successively switching the operation of said M color television cameras per period of the color subcarrier signal in response to the horizontal synchronization signal, vertical synchronization signal, stereoscopic synchronization signal and color subcarrier signal, while changing for each field the order in which the operation of said M color television cameras is switched during every M periods of the color signal; and
    means for transmitting output signals from said M color television cameras whose operation is switched in turn, together with the horizontal synchronization signal, vertical synchronization signal, stereoscopic synchronization signal and color subcarrier signal.

3. A cathode ray tube for reproducing a stereoscopic color image comprising a lenticular lens assembly including a plurality of lenticular lenses each extending in a vertical direction of a faceplate of said cathode ray tube and arranged in a horizontal direction of said faceplate and each adapted to display the effect of a convex lens only in the horizontal direction of said faceplate, and a pluralityof sets of three horizontally and continuously extending phosphor stripes which are repeatedly formed on a focal plane of said lenticular lenses in the vertical direction of said faceplate; and at least one set of vertically arranged three electrode guns adapted to land electron beams on the corresponding phosphor stripes.

4. A stereoscopic color television transmission method comprising the steps of:
    photographing an object by three color television cameras provided with color signal outputs each divided into fields of horizontal line scans and said cameras being horizontally arranged at equal intervals;
    generating a horizontal synchronization signal at the end of each horizontal scan, a vertical synchronization signal for each field, a stereoscopic synchronization signal for every 6 fields and a periodic color subcarrier signal;
    switching the operation of said three color television cameras successively in response to said horizontal synchronization signal, said vertical synchronization signal, and said stereoscopic synchronization signal at a rate dependent on the period of said color subcarrier signal, while changing for each field the order in which the operation of said three color television cameras is switched over during every 3 periods of said color subcarrier signal; and sending forth output signals from said three color television cameras together with said horizontal synchronization signal, said vertical synchronization signal, said stereoscopic synchronization signal and said color subcarrier signal.

5. The stereoscopic color television transmission method of claim 4 wherein said step of switching the operation of said three color television cameras includes switching the three cameras in circular succession and in synchronism with said color subcarrier signal; the switching of said three and cameras being synchronized by said horizontal synchronization signal to start said switching of said three cameras from the same camera for each horizontal line scan in the same field; the switching of said three cameras being shifted by the vertical synchronization pulse upon the completion of each field such that in a first field the switching of said three cameras begins from a first camera, in a second field following the first field the switching of said three cameras starts from a second camera, in a third field following the second field the switching of said three cameras starts from a third camera, and then in successive fourth, fifth and sixth fields the switching of said three cameras starts from the first, second and third cameras, respectively; and the switching of said three cameras is reset by said stereoscopic synchronization signal such that the switching of said three cameras starts from the first camera every 6th field.

6. A stereoscopic color television transmission system comprising:
three color television cameras equidistantly arranged in a horizontal direction to stereoscopically photograph an object, said cameras being provided with output terminals for deriving three color signals each divided into fields of horizontal line scans;
means for providing a horizontal synchronization signal for each horizontal scan, a vertical synchronization signal for each field, a stereoscopic synchronization signal for every 6 fields and a color subcarrier signal;
means for successively switching the operation of said three color television cameras per period of the color subcarrier signal in response to the horizontal synchronization signal, vertical synchronization signal, stereoscopic synchronization signal and color subcarrier signal, while changing for each field the order in which the operation said three color television cameras is switched during every 3 periods of the color subcarrier signal; and
means for transmitting output signals from said three color television cameras whose operation is switched in turn, together with the horizontal synchronization signal, vertical synchronization signal, stereoscopic synchronization signal and color subcarrier signal.

7. The stereoscopic color television transmission system according to claim 6 further comprising a stereoscopic television receiver apparatus comprising:
a cathode ray tube having a faceplate, a shadow mask formed with apertures in horizontal and vertical directions, a lenticular lens assembly which is disposed between said faceplate and shadow mask, and is formed of lenticular lenses horizontally arranged with substantially the same width as the horizontal pitch of apertures of said shadow mask, and each adapted to represent the effect of a convex lens only in the horizontal direction, and a plurality of sets of three color phosphor strips with each stripe formed horizontally and continuously and each set formed with substantially the same width as the vertical pitch of apertures of said shadow mask on the focal plane of said lenticular lens assembly which faces said shadow mask, and 3 horizontally arranged groups of electron guns each formed of three vertically arranged electron guns;
means for demodulating, upon receipt of the transmitted signal, the horizontal synchronization signal, vertical synchronization signal, stereoscopic synchronization signal, color subcarrier signal and three video signals including color information;
means for coupling the three video signals to the corresponding electron guns of said 3 groups of electron guns included in said cathode ray tube; and
means for successively switching the operation of said 3 groups of electron guns in response to the horizontal synchronization signal, vertical synchronization signal, stereoscopic synchronization signal and color subcarrier signal in synchronism with the switching of said 3 television cameras.

8. The stereoscopic color television transmission system according to claim 6 further comprising a stereoscopic television receiver apparatus comprising:
a cathode ray tube having a faceplate, a shadow mask formed with apertures in horizontal and vertical directions, a lenticular lens assembly which is disposed between said faceplate and shadow mask and is formed of lenticular lenses horizontally arranged with substantially the same width as the horizontal pitch of apertures of said shadow mask and each lenticular lens adapted to represent the effect of a convex lens only in the horizontal direction, a plurality of sets of three color phosphor stripes with each stripe formed horizontally and continuously and each set formed with substantially the same width as the vertical pitch of apertures of said shadow mask on the focal plane of said lenticular lens assembly which faces said shadow mask, and three electron guns vertically arranged;
means for demodulating, upon receipt of the transmitted signal, the horizontal synchronization signal, vertical synchronization signal, stereoscopic synchronization signal, color subcarrier signal and three video signals including color information;
means for coupling the three video signals to the corresponding electron guns included in said cathode ray tube; and
means responsive to the horizontal synchronization signal, vertical synchronization signal, stereoscopic sychronization signal and color subcarrier signal for horizontally shifting electron beams emitted from said three electron guns in synchronism with the switching of said 3 television cameras.

9. The stereoscopic color television transmission system according to claim 6, further comprising a stereoscopic televison receiver apparatus comprising:
a cathode ray tube having an anode to be held at an anode voltage, a faceplate, a meshy focusing grid to be held at a potential lower than said anode voltage, a lenticular lens assembly which is disposed between said faceplate and focusing grid, and formed of lenticular lenses horizontally arranged with substantially the same width as the horizontal width of each mesh of said focusing grid and each adapted to display the effect of a convex lens only in a horizontal direction, and a plurality of sets of three phosphor stripes with each stripe formed horizontally and continuously and each set formed on the focal plane of said lenticular lens assembly which faces said focusing grid and vertically arranged with a width equal to the vertical width of each mesh of said focusing grid, three vertically arranged electron guns;

means for demodulating in response to reception of the transmitted signal, a horizontal synchronization signal, vertical synchronization signal, stereoscopic synchronization signal, color subcarrier signal and three video signals including color information;

means for coupling the three video signals to the corresponding electron guns of said cathode ray tube; and means responsive to the horizontal synchronization signal, vertical synchronization signal, stereoscopic synchronization signal and color subcarrier signal to horizontally shift electron beams emitted from said three electon guns in synchronism with the switching of said television cameras.

* * * * *